United States Patent
Shi

(10) Patent No.: US 8,734,923 B2
(45) Date of Patent: May 27, 2014

(54) BLOW MOLDED POLYESTER CONTAINER WITH AN OVER-MOLDED THERMOPLASTIC LAYER

(75) Inventor: Yu Shi, Branchburg, NJ (US)

(73) Assignee: Colgate-Palmolive Company, New York, NY (US)

( * ) Notice: Subject to any disclaimer, the term of this patent is extended or adjusted under 35 U.S.C. 154(b) by 923 days.

(21) Appl. No.: 12/062,999

(22) Filed: Apr. 4, 2008

(65) Prior Publication Data

US 2008/0241447 A1 Oct. 2, 2008

Related U.S. Application Data

(63) Continuation-in-part of application No. 11/307,700, filed on Feb. 17, 2006, now Pat. No. 8,192,812.

(60) Provisional application No. 60/661,736, filed on Mar. 15, 2005.

(51) Int. Cl.
*B32B 1/02* (2006.01)
*B29B 11/10* (2006.01)

(52) U.S. Cl.
USPC .................................. 428/35.7; 428/542.8

(58) Field of Classification Search
USPC ................................. 428/35.7, 36.91, 542.8
See application file for complete search history.

(56) References Cited

U.S. PATENT DOCUMENTS

| | | |
|---|---|---|
| 4,543,364 A | 9/1985 | Nankee et al. |
| 4,604,257 A | 8/1986 | Smith et al. |
| 4,959,421 A | 9/1990 | Hirahara et al. |
| 4,997,707 A | 3/1991 | Otawa et al. |
| 5,681,628 A | 10/1997 | Niederst et al. |
| 5,688,570 A | 11/1997 | Ruttinger, Sr. |
| 5,733,617 A | 3/1998 | Baduel |
| 5,851,471 A | 12/1998 | Schloss et al. |
| 5,888,598 A | 3/1999 | Brewster et al. |
| 6,004,638 A | 12/1999 | Kaya et al. |

(Continued)

FOREIGN PATENT DOCUMENTS

| | | |
|---|---|---|
| BE | 1017144 A5 | 3/2008 |
| EP | 1 547 751 A1 | 6/2005 |

(Continued)

OTHER PUBLICATIONS

Product Information, Affinity PF 1140G: Dow Plastics, two pages (Apr. 2003).

(Continued)

*Primary Examiner* — Erik Kashnikow
(74) *Attorney, Agent, or Firm* — Judy W. Chung

(57) ABSTRACT

Polyester containers that are produced from polyester preforms, the preforms preferably having a thermoplastic overmold layer on at least a part of the exterior surface of the preform. In one aspect the invention can be a perform that is made by over-molding the thermoplastic layer onto the preform surface in one or more over-molding operations. In a single over-molding embodiment the preform has a body layer of a first color and the over-molded layer of a second color. The over-mold layer can have a thickness gradient varying in thickness from one end of the preform to adjacent another end of the preform. This will give the blow molded container a unique appearance where there the container will be substantially transparent or of a first color and the overmold layers of differing colors.

11 Claims, 9 Drawing Sheets

(56) References Cited

U.S. PATENT DOCUMENTS

| | | | |
|---|---|---|---|
| 6,112,951 | A | 9/2000 | Mueller et al. |
| 6,322,738 | B1 | 11/2001 | Sicilia et al. |
| 6,391,408 | B1 | 5/2002 | Hutchinson |
| 6,485,804 | B1 | 11/2002 | Nakamachi et al. |
| 6,676,883 | B2 | 1/2004 | Hutchinson et al. |
| 6,808,820 | B2 | 10/2004 | Lee et al. |
| 6,939,591 | B2 | 9/2005 | Hutchinson et al. |
| 2002/0193523 | A1 | 12/2002 | Akkapeddi et al. |
| 2003/0170460 | A1 | 9/2003 | Sienkiewicz et al. |
| 2004/0212120 | A1 | 10/2004 | Giraud |
| 2005/0011892 | A1 | 1/2005 | Nakajima et al. |
| 2005/0082707 | A1 | 4/2005 | Sabin et al. |
| 2005/0170113 | A1* | 8/2005 | Hill .............................. 428/35.7 |
| 2006/0210746 | A1 | 9/2006 | Shi et al. |

FOREIGN PATENT DOCUMENTS

| | | |
|---|---|---|
| JP | 04146118 | 5/1992 |
| JP | 09193303 | 7/1997 |
| JP | 11005275 | 1/1999 |
| JP | 2000079928 | 3/2000 |
| JP | 2000117820 | 4/2000 |
| JP | 2000271991 | 10/2000 |
| JP | 2002154134 | 5/2002 |
| JP | 2006334855 | 12/2006 |
| WO | WO 2004/022307 * | 3/2004 ............. B29C 47/06 |
| WO | 2007/046068 A1 | 4/2007 |

OTHER PUBLICATIONS

Batistini, "New Polyolefin Plastomers and Elastomers made with Insite Technology: Structure-Property Relationship and Benefits in Flexible Thermoplastic Applications," Macromol. Symp. 100:137-42 (1995).

Santoleri, "Overmolding and Co-Extruding Melt-Processible Rubber on Rigid Substrates," Rubber World. four pages vol. 222, No. 2 (May 2000).

Schneider, "Practical Guidelines for Overmolding TPEs-A Molder's Perspective," TPE's 2000: New Century Prog. Oppor., pp. 187-199 (1999).

Tam. et al., "Multi-Component Injection Molding with TPEs," TPE's 2000: New Century Prog. Opport., pp. 203-216 (1999).

Weng, et al., "TPE Overmolding Compounds for the Next Millenium," ANTEC '99, pp. 3483-3488 (1999).

Exact Plastomers. ExxonMobil, Chemical, Impact Modifiers for Clarified RCP 2 pages (2001).

TEKBOND Thermoplastic Elastomer—Teknor Apex Company, one page (Jun. 2003).

International Search Report PCT/US2009/039628 Date of Mailing Dec. 8, 2009.

International Search Report and Written Opinion in International Application No. PCT/US09/039628, mailed Dec. 8, 2009.

* cited by examiner

BLOW MOLDED POLYESTER CONTAINER WITH AN OVER-MOLDED THERMOPLASTIC LAYER

CROSS-REFERENCE TO RELATED APPLICATIONS

This application is a continuation-in-part application of U.S. patent application Ser. No. 11/307,700 filed Feb. 17 2006, now pending, which application claims the benefit of U.S. Provisional Application No. 60/661,736, filed Mar. 15, 2005. These applications are incorporated herein by reference in their entirety.

BACKGROUND OF THE INVENTION

This invention relates generally to blow molded polyester containers that have an exterior layer of a thermoplastic of a different functionality, such as color, and in particular to polyester containers where the exterior layer has a varied thickness which results in an exterior layer with a color gradient.

BACKGROUND OF THE INVENTION

It is important for a product to be well presented on a store shelf. For many products this will involve the package for the product. This is particularly the case for products that must be within a container on the store shelf. This includes liquid, gel, viscous, and powder products. Since such products usually will not be clearly seen at the time of purchase the decision to purchase a product will depend on the product presentation. This includes the container design, coloration, and the container graphics. The present invention is directed to the design and the coloration of the container. Many of the containers used today are thermoplastic containers, such as polyester containers that are blow molded from preforms. The preform can be clear or it can have a color. It is in the shape of an elongated tube and usually will have threads on an upper open end. The upper end will be essentially the same on the container as on the preform. In blow molding to a container the preform is heated to soften the thermoplastic so that it can flow during the stretch and blowing operations. The preform is stretch blow molded in a mold where the mold cavity has the negative of the exterior shape of the container that is being stretch blow molded. A rod stretches the preform longitudinally while the preform is being blown primarily laterally with a high pressure gas. The blow molded container will have the color of the preform and the shape of the mold cavity.

In the usual ways of making a thermoplastic based container, such as a polyester based container, the container can be clear or have a particular color. It will be clear or be the single color of the preform. The full preform, including the threaded neck will be of the same color. The problem then is how to efficiently improve the aesthetic appearance of containers. Using the processes of the present invention preforms and containers can be produced having an exterior color gradient, as well as a plurality of colors arrayed longitudinally around the container. These plurality of colors also can be in the form of color gradients. This is accomplished by an over molded thermoplastic layer over part or most of the preform and container. In addition, the containers can have varied colors through color differentiation and color matching. In color differentiation the preform can be of a first color and the over molded thermoplastic layer a different color with each being distinctly different colors. In color matching the preform will be of a first color and the over molded layer a complimentary color so that there can be perceived a third color by light passing through the two layers. Color matching will occur when the over mold layer has a thickness gradient over a wall of the container. This will be more apparent in a container blow molded from a preform where the over molded layer is of a decreasing thickness (gradient) allowing for the color of the container to be seen mixing with the color of the over molded layer and producing a tint of a third color. As an example a first color preform and a second color over molded layer will give each of these colors where the other color is visually absent and a varying blend in areas where there is a gradient in the thickness of the over-mold layer so that light is reflected from both colors. Thus a blue container will give a blue at one end where there is no over mold layer and green at the other end where solely an over-mold green layer is visually perceptive, with a blend of the two colors between each end. This will provide a great number of ways to decorate a container. The container can further be decorated by utilizing the color of the product within the container.

The prior art is directed to forming polyester preforms and coating these preforms with a coating of a barrier material. These will be moisture and/or gas barrier materials. The preforms then are blow molded by conventional processes and equipment to form the desired container. These usually are beverage containers. Such preforms and containers are disclosed in U.S. Pat. Nos. 6,391,408; 6,808,820 and 6,939,591. The objective in these patents is to produce containers with enhanced barrier properties. There is no disclosure as to how to significantly improve the aesthetic appearance of the containers as well as various physical properties. The over molding of polyester preforms and containers with elastomers is set out in my related application U.S. patent application Ser. No. 11/307,700, filed Feb. 17, 2007.

BRIEF SUMMARY OF THE INVENTION

The invention is directed to blow molded containers having a container body layer and an over molded layer, the blow molded containers having a container body and a container dispensing exit, at least a portion of the container body having a thermoplastic container body layer and a thermoplastic over molded layer, the container body layer being transparent or a first color and the over molded layer being of a second color. The container has a first end and a second end, the container dispensing exit on the first end and a container base on the second end. There can be a plurality of over molded layers on the container body layer. A thickness gradient of the over-molded layer(s) can vary from the first end to the second end or from the second end to the first end. In one embodiment the thickness gradient of the over molded layer is greater at the second end than at the first end, the color of the container body being darker at the second end than at the first end, and in a second embodiment the over molded layer thickness gradient is greater at the first end than at the second end, the color of the container body being darker at the first end than at the second end. This will yield a visual color gradient from one end to the other end.

The first color and the second color can be complementary colors where in a blend of the colors there is yielded a third color. The colors are blended when the thickness of the over molded layer is sufficiently thin that light passes through the container body layer and the over molded layer. The first and/or the second color can be a plurality of colors in a set pattern.

A preform for making the blow molded containers has a first end and a second end, the first end being open and forms the dispensing exit of the blow molded container and the second end being closed and forms the base of the container, the preform having a preform body layer and a preform over molded layer, the preform body layer being essentially transparent or of a first color and the preform over molded layer being of a second color. There can be multiple preform over molded layers. The thickness of the preform over molded layer(s) can vary from the first end to the second end. The thickness of the over molded layer(s) in one embodiment is greater at the second end than at the first end, the color of the preform being darker at the second end than at the first end, and in another embodiment is greater at the first end than at the second end, the color of the preform being darker at the first end than at the second end. When there is a plurality of over molded layers one or more can be of a constant thickness or a gradient thickness.

The blow molded container and the preform have a body layer which is a thermoplastic layer of the container and the over molded layer is a thermoplastic layer, preferably a non-elastomeric thermoplastic layer. The preform thermoplastic is selected from the group consisting of polyethylene terephthalate, polybutylene terephthalate and polyethylene naphthalate. The over molded layer is selected from the group consisting of polyethylene terephthalate, polybutylene terephthalate, polyethylene naphthalate, polyethylene polymers, polyethylene copolymers, polypropylene polymers, polypropylene copolymers and vinyl copolymers.

The color of the body layer and the color of the over molded layer will blend in the areas of the preform and the container where the over molded layer has a thickness to allow the color of the body layer to be perceived. Depending on the thickness of this over molded layer the blended color will vary with the thickness of the over molded layer. In the embodiment where the over molded layer is thick at one end and absent at the other end with a transition from thickness to an absence of the over molded layer. The preform and the blow molded container will have the color at the over molded layer at the one end and the color of the container body layer at the other end. Between the one end and the other end there will be a blended color which will produce various shades of a third color. The blow molded container will have a unique and decorative appearance over the usual opaque or transparent container. In a further embodiment the product in the container may be of a color which can be perceived through the container body layer and the over molded layer. Depending on the depth of the body layer color and the depth of the over molded layer color, the product color can be a part of the color blend at parts of the container where the color of the product can be perceived through the container body layer and the over molded layer. Where the container body layer is substantially transparent (means that the product in the container can be visually perceived through the container wall) the color of the product will be the blending color with the over mold layer(s) in the areas where the color of the product can be perceived. Where the over mold layer is of a gradient form the color of the product will be perceived in the area of decreased thickness of the over molded layer(s). The product color will be solely perceived in the areas where there are no over mold layers.

The over molded layer can be on all or a part of the body layer of the preform and of the container blow molded from this preform. In addition the over molded layer can be in a multiple longitudinally striped pattern on the body layer with the stripes being of varying colors. Each of these stripes can have a thickness from the one end to the other end, and this can vary from stripe to stripe. The net result is a wide range of possible color variations for the container which will enhance its aesthetic appearance on the store shelf and later in the residence of the purchaser.

DETAILED DESCRIPTION OF THE INVENTION

The invention will be disclosed in more detail in its preferred embodiments with reference to the accompanying drawings. The invention is susceptible to variations in details, but all such variations are within the concepts disclosed in this application.

Figure 1:
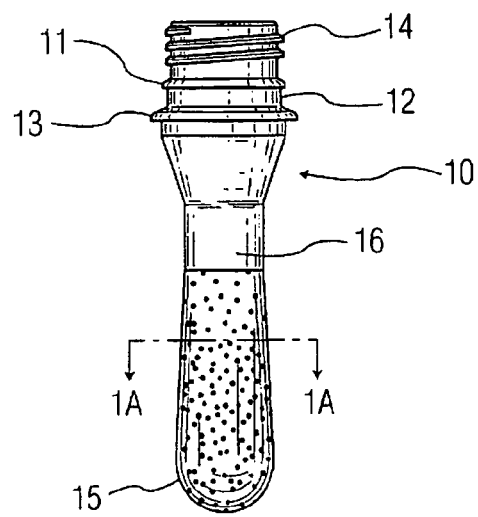
FIG. 1 is an elevation view of a container preform with a lower portion over-molded with a thermoplastic polymer having a color.
Figure 1A:
FIG. 1A is a cross-section view of the preform of FIG. 1 along line 1A-1A.
Figure 3:
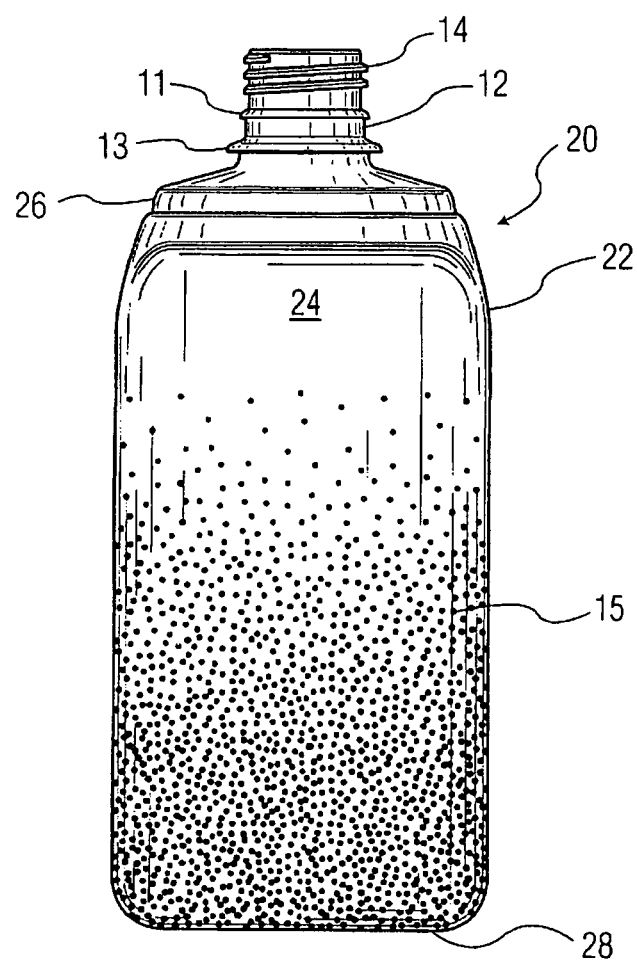
FIG. 3 is an elevation view of a container blow molded from the preform of FIG. 1.
Figure 5:
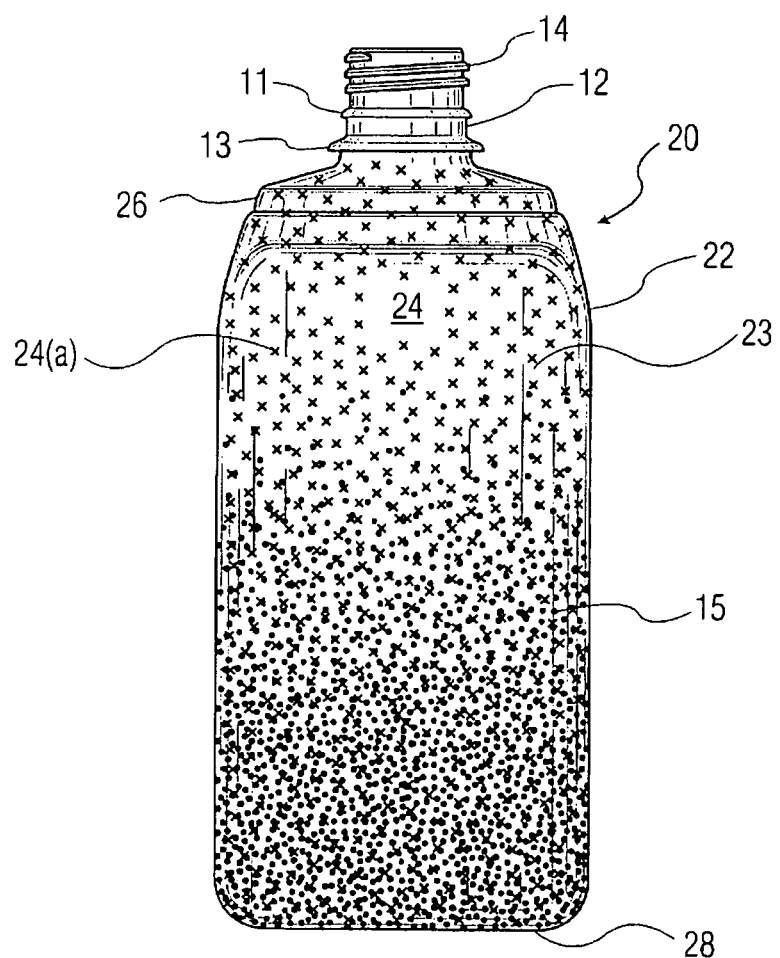
FIG. 5 is an elevation view of the container of FIG. 3 blow molded from the preform of FIG. 1 and containing a colored liquid.

FIG. 1 discloses a preform 10 which has neck 12 with threads 14. Also on the neck there is a seal flange 11 and a transport flange 13. The transport flange supports the preform while it is being heated and transported to the blow mold. Below the neck is preform body portion 16 that will be blow molded to form the body of the container that is to be formed. Over-molded onto the preform body portion 16 is thermoplastic layer 15. This is shown with circular stippling. This is in the form of a gradient layer which is tapered from the base of the preform to about a mid-point of the preform. This usually will be a color gradient layer. FIG. 1A shows a cross-section of the preform along line 1-1 of FIG. 1 with the thermoplastic over-molded layer 15. A container 20 blow molded from this preform of FIG. 1 is shown in FIG. 3. The container 20 has a container body portion 22, shoulder 26, bottom surface 28 and a front surface 24. All sides of the essentially quadrangular shaped container 20 have an over-molded layer 15. The thickness of the over-molded layer decreases from the bottom 28 of the container up into the body portion 22 of the container 20. The upper neck part 12 of the container remains the same as in the preform. It contains the threads 14, seal flange 11 and transport flange 13. FIG. 5 shows this container 20 with a colored liquid 23 in the container. The color of the liquid 23 is shown by an x-stippling 24(*a*). The color of the liquid 23 in the container 20 will be different from that of the over-molded thermoplastic for contrast purposes. In the transition area from upper portion where the liquid 23 is visible (x-stippling 24(*a*)) to the over-molded layer15 both the color of the contained liquid 23 and that of the over-molded thermoplastic layer 15 can be seen. There is a mixture of x-stippling and circular-stippling. Depending on the colors of the liquid and of the over-molded thermoplastic in the interface area there can be a color blending in this area to give the appearance of a third color. This color blending in this area further enhances the appearance of the container and the product in the container. This is a use of the color of the contained liquid to enhance the aesthetic appearance of the container.

Figure 2:
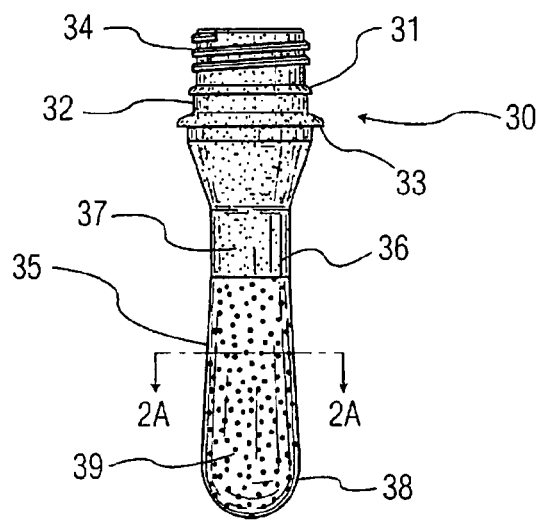
FIG. 2 is an elevation view of a container preform of a first color and a lower portion over molded with a thermoplastic of a second color.
Figure 2A:
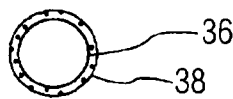
FIG. 2A is a cross-section of the preform of FIG. 2 along line 2A-2A.
Figure 4:
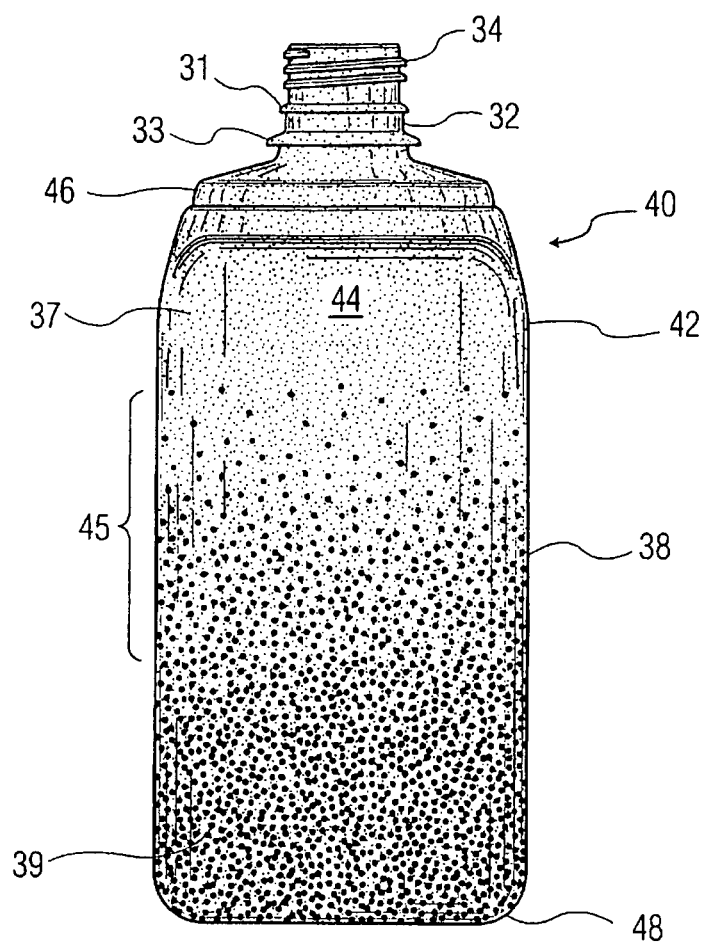
FIG. 4 is an elevation view of a container blow molded from the preform of FIG. 2.

FIG. 2 shows a preform 30 where the color of the preform plastic is different from that of the over-molded thermoplastic layer 38. The preform has a neck portion 32 with threads 34, a seal flange 31 aid a transport flange 33. The preform body portion 36 has the same color as the neck portion, including the lower portion that is over-molded with thermoplastic layer 38. The small dot-stippling 37 denotes the color of the preform and the circular stippling 39 the color of the thermoplastic over-molded layer 38, the color of the over-molded layer 38 different color from the preform plastic. This preform is shown in cross-section in FIG. 2A. The over-molded layer 38 has decreasing thickness Up to about a mid-point 35 of the preform. Such a point of decreasing thickness can be at essentially any part of the preform body 36. At the area where the over-molded layer blends into the preform body there will be some color blending. However, this will not be as evident as in the resulting blow molded container. The container blow molded from this preform of FIG. 2 is shown in FIG. 4. The container 40 has a neck 32 with threads 34, seal flange 31 and transport flange 33. Below the neck is shoulder 46 and body portion 42 with front surface 44 terminating with bottom surface 48. There is a blending region 45 where the color 37 of the thermoplastic of the upper portion of the container blends into the color 39 of the lower over-molded portion of the container. In this area there will be a color blending to produce shades of a third color depending on the colors and the thickness of the over-molded layer at any one point of the container surface. The net result is that the upper part of the container can have one color, the lower part of the container another color, and the mid-area a blending a third color or be a multi-color. This will enhance the appearance of the container.

Figure 6:
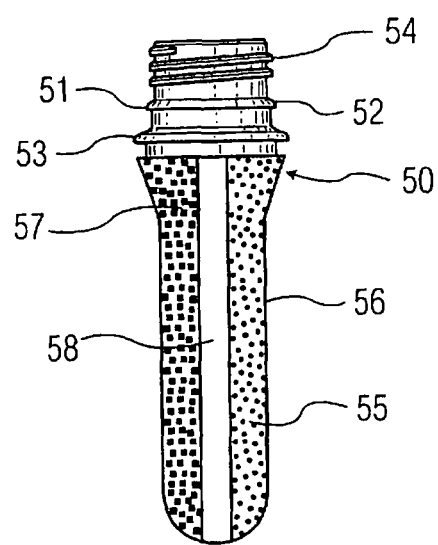
FIG. 6 is an elevation view of a container preform with two portions over molded with different thermoplastic polymers.
Figure 7:
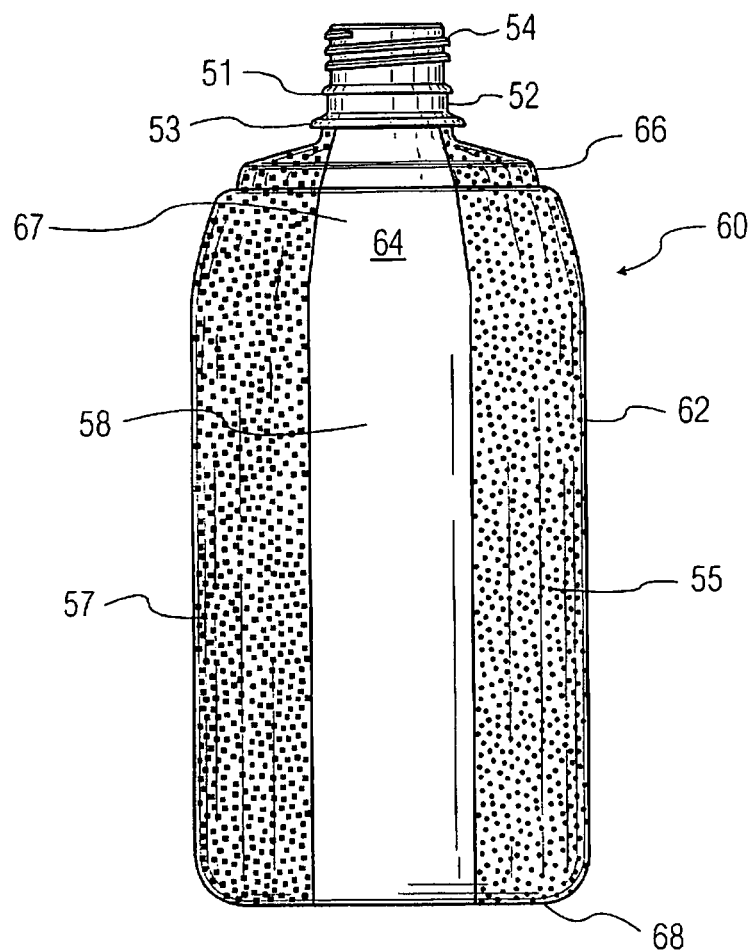
FIG. 7 is an elevation view of a container blow molded from the preform of FIG. 6

FIG. 6 shows a preform 50 that has a neck 52 with threads 54, a seal flange 51 and a transport flange 53. The preform body portion 56 has been over-molded with two different thermoplastics. These are thermoplastic 55 (circular-stippling) and thermoplastic 57 (square-stippling). As shown, the preform 50 has a perform surface that includes a smooth and continuous surface where the over-molded layers 55 and 57 contact the preform 50. The container thermoplastic will be seen at portion 58. In one preferred embodiment each of the over-molded layers 55;57 will be of a different color. In addition the container thermoplastic layer 58 which shown as clear can be of a different color. In another preferred embodiment either, or both, of over-molded layers 55;57 can have a reduced thickness gradient as shown in FIGS. 1 to 4) near the top of the preform 50 whereby in the container that is formed from the preform a color of the container liquid will blend with the color of over-molding layers 55;57 and the container thermoplastic 58 to produce a color blend in the upper part of the container. If the preform will have two different thermoplastics for over-molding layers 55;57 it will have to undergo two injection over-molding operations, one for each thermoplastic over-molded section. However, an option is one bi-injection molding operation. The container 60 that is blow molded from this preform 50 is shown in FIG. 7. The container has neck 52 with threads 54, seal flange 51 and transport flange 53. Below the neck 52 of the container 60 are shoulder 66, container body portion 62 and bottom surface 68. The container body portion 62 has a front surface 64. On the front surface there are three sections. 55, 57 and 58. These can be of two or three colors. There is a mid-section 58 that can be clear or of a first color, the first color being that of the thermoplastic. In addition sections 55 and 57 can be of different colors, that is a second and third color, or different shade variants of the same color. Further in the mid-section 58, the color of the container liquid can be clearly seen when the container plastic is substantially transparent or a blended color when the container thermoplastic in section 58 has a color. This can blend into the color of the container thermoplastic of section 58 and provide a different color. In this embodiment there can be variants where either one or both over-molded layers 56 and/or 57 can be in a gradient form as shown in FIGS. 1 to 4. That is, these over-molded layers will have a thickness gradient, usually from the base to an upper part of the preform and in the container blow molded from this preform. The gradient also can be from the upper part to the base.

Figure 8:
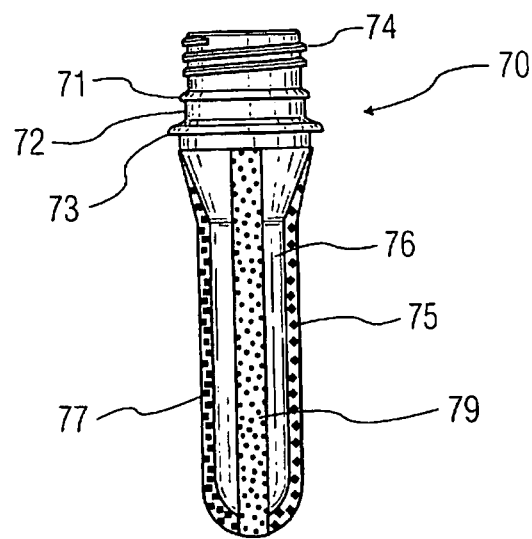
FIG. 8 is an elevation view of a container preform with three portions over molded with three different thermoplastic polymers.
Figure 9:
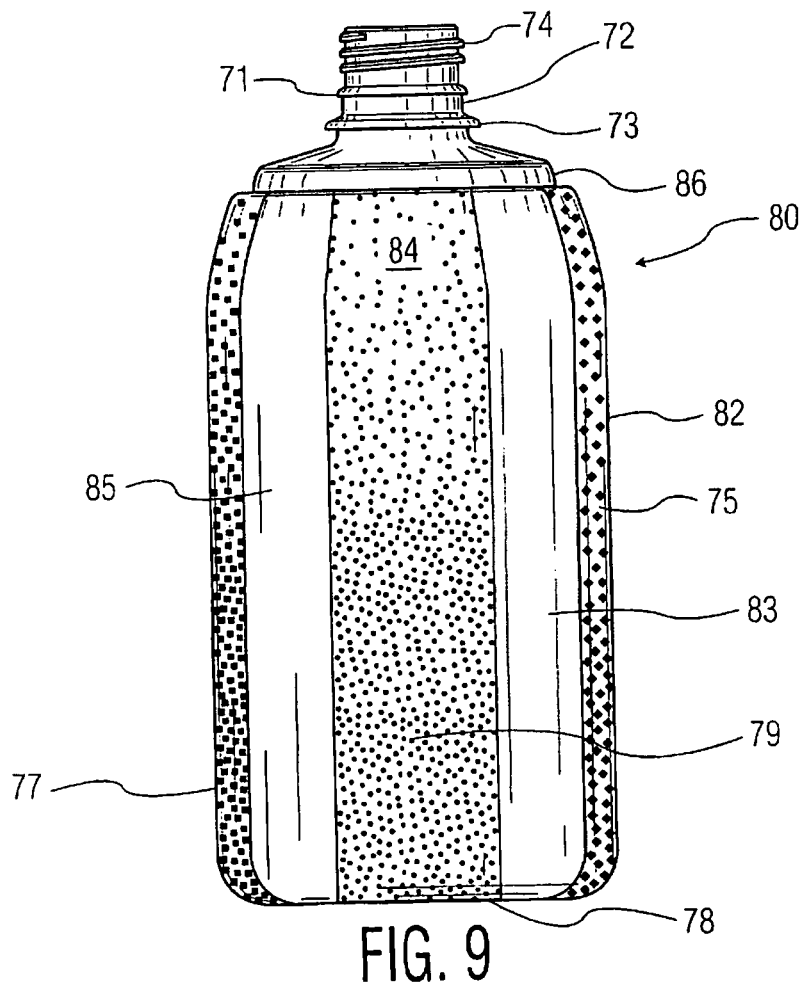
FIG. 9 is an elevation view of a container blow molded from the preform of FIG. 8.

FIG. 8 shows a preform 70 which has three over-molded layers, 75, 77 and 79 showing (rear center can have an over-molded layer the same as 79). The preform 70 has a neck 72 with threads 74, a seal flange 71 and a transport flange 73. The body 76 of the preform has the three over-molded layers 75 (diamond-stippling), 77 (square-stippling) and 79 (circular-stippling). Between the over-molded layers there is the surface of the preform body 76. The preform body can be transparent or a color depending on the container to be produced. A version of the container 80 blow molded from this preform is shown in FIG. 9. The container 80 has a neck portion 72, threads 74, seal flange 71 and transport flange 73. Below the neck is shoulder 86 and container body portion 82. The container body portion 82 has front surface 84 with three over-molded layers 75, 77 and 79. Between the three over-molded layers the surface of the container is exposed at 83 and 85. The color of the product will be seen through areas 83 and 85 when the container thermoplastic of these areas is substantially transparent. When the container thermoplastic is more opaque the container thermoplastic will be seen through these areas 83 and 85. The three over-molded layers can be of the same color, different colors or variants of these colors. In addition, one or more also can be of gradient thicknesses. Further, the liquid in the container 80 can be of another color. Thus there can be a container embodiment of up to four different colors. This will provide many opportunities for color blending and for unique appearances for the container.

Figure 10:
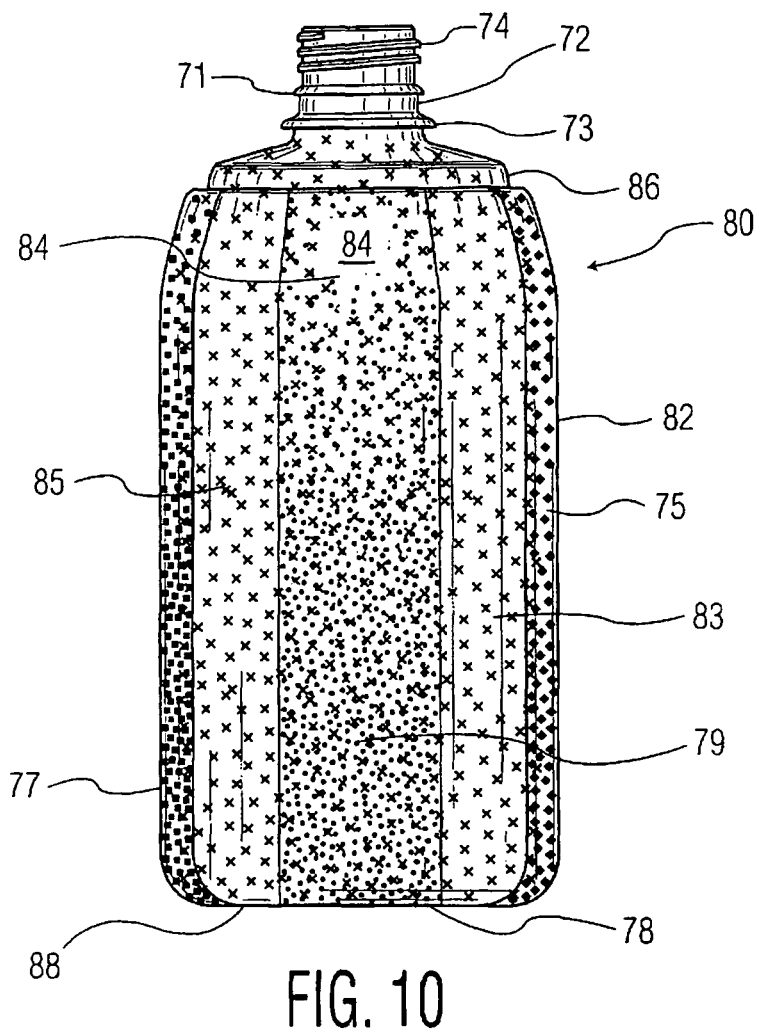
FIG. 10 is an elevation view of a container blow molded from the preform of FIG. 8 and containing a colored liquid.

FIG. 10 shows a further embodiment of the container of FIG. 9. In this embodiment the plastic of the container will have a color. The portions 83 and 85 will have a color (shown here by x-stippling) which can be the same or different from any of the over-mold layers 75, 77 and 79. It usually will be different. The over mold layer 79 is shown as a color gradient. The result is the container color blending into the color of over-mold layer 79 in the area in and under the shoulder 86. In this version, the preform of FIG. 8 will have the color that will be visible in portions 83 and 85 of the container 80. The blow molded container 80 will have the same color as the preform 70. In a variation of this FIG. 10 the container can contain a liquid of a further color. The net result can be a container and product of tip to four different colors and several color gradients.

Figure 11:
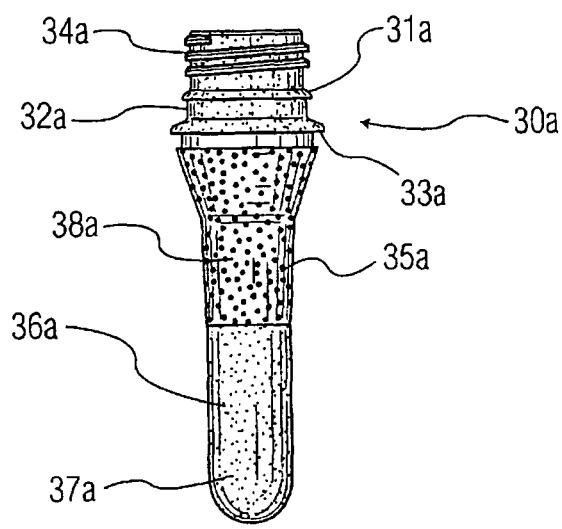
FIG. 11 is an elevation view of a preform with an upper portion over molded with a thermoplastic polymer containing a color.
Figure 12:
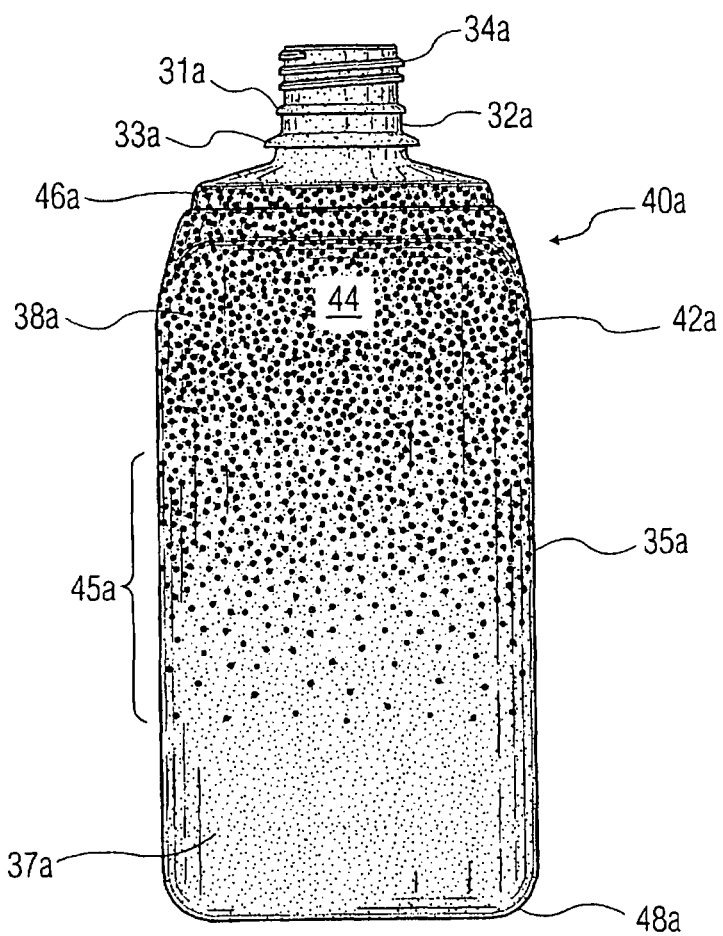
FIG. 12 is an elevation view of the container blow molded from the preform of FIG. 11.

FIG. 11 shows the preform of FIG. 2 in a reverse over mold orientation. Here the upper portion of preform body 36a is over-molded with the over-mold thermoplastic 38a (circular stippling). The preform body portion 36a is the lower portion of the preform 30a and has a color 37a (dot-stippling). The neck 32a has threads 34a, seal flange 31a and transport flange 33a. FIG. 12 shows the container 40a that is blow molded from this preform of FIG. 11. It is essentially the reverse of the container of FIG. 4. Here the over-mold layer is on an upper part of the container 40a while in FIG. 4 the over-mold layer is on a lower pest of container 40. This container 40a has a neck 32a, threads 34a, a seal flange 31a and a transport flange 33a. The container has a container body 42a, a base surface 48a, and a shoulder 46a connecting it to the neck 32a. The over mold layer 38a covers the upper part of the container body 42a with a gradient transition at 35a to the container thermoplastic 37a. In the blending region 45a there is a blending of the color of the over-mold thermoplastic layer 38a with the color of the container thermoplastic 37a. This will produce a unique color tint.

The preform can be made from a variety of thermoplastic polymers. In one embodiment, the thermoplastic polymer includes one or more polyesters. In another embodiment, the thermoplastic polymer includes a polypropylene. In a preferred embodiment, the thermoplastic polymer is or includes a polyethylene terephthalate copolymer. In one embodiment, the polyesters are suitable for packaging consumer products, carbonated or non-carbonated beverages, and oxygen sensitive food products. Suitable polyesters include PET copolymers, polyethylene naphthalate (PEN), polyethylene isophthalate, glycol modified amorphous PET copolymer, (commercially known as PETG), diacid modified amorphous PET, and the like. PET copolymers are particularly useful because they are used in many container applications. As used herein, "PET copolymers" refers to those compositions that comprise a diol component having repeat units from ethylene glycol and a diacid component having repeat units from terephthalic acid. Desirably, in some embodiments, the PET copolymer has less than 20% diacid component modification and/or less than 10% diol component modification, based on 100 mole % diacid component and 100 mole % diol component. Such PET copolymers are well known.

Optionally, a multi-layer preform may be used. For example, the preform could comprise a 3- or 5-layer structure, as known in the art. In one embodiment of a 3-layer preform stricture, the middle layer is a barrier layer, the product-contacting layer and the external layer are polyester layers. In one embodiment of a 5-layer preform structure, the inside and outside layer are virgin polyester layers, the second and fourth layers are recycled PET layers, and the third layer is a barrier layer.

In a preferred embodiment, the preform comprises a cylindrical injection-molded preform having an open top end and neck finish. In one embodiment, the preform further comprises a tapered shoulder-forming portion, a middle cylindrical portion of substantially uniform thickness, and a base-forming portion. In various embodiments, the preform is amorphous and substantially transparent.

Generally, embodiments of this invention can be made with blow molding. The various methods of blow molding are well known. In a preferred embodiment, the blow-molding process comprises a preform reheat stretch blow mold process, as well known in the art.

In one embodiment, the over-molded preform is placed in a blow molding apparatus having an upper mold section which engages the neck finish, a middle mold section having an interior cavity forming the shape of the container side wall, and a lower mold section having an upper surface forming the outwardly concave dome portion of the container base. In a preferred embodiment, the base material is PET copolymer. In accordance with a conventional reheat stretch blow mold process, the injection-molded preform is first reheated to a temperature suitable for stretching and orientation (e.g., 80 to 130° C.), placed in the blow mold, and an axial stretch rod is then inserted into the open upper end and moved downwardly to axially stretch the preform. Subsequently or simultaneously, an expansion gas is introduced into the interior of the preform to radially expand the shoulder, sidewall and base forming portions outwardly into contact with the interior surfaces of mold sections. The resulting blown container has the same neck finish with outer threads and lowermost neck flange as the preform. The remainder of the container undergoes expansion, although to varying degrees. Typically, the over-mold material expands and stretches with the base preform in a proportional manner.

The over-mold material is a thermoplastic, and preferably a non-elastomeric thermoplastic. In a further preferred embodiment the over-mold layer is of the same thermoplastic as the thermoplastic as the preform. In this way they will have the same stretching properties during blow molding. Thus the over-mold layer or layers can be PET, PEN or PETG thermoplastics as described above. In addition the over-mold layer can be a polyolefin polymers and copolymers, polypropylene polymers and copolymers and other polyesters such as polylactic acid, polyhydroxy butyrate or polyglycolic acid polymers.

The over-molding step comprises injection molding of the thermoplastic over-mold material with, or onto, a container preform. Bi-injection molding techniques are useful when the over-molding material is co-injection molded with the preform plastic to produce the over-molded preform in a single operation. However, first forming the preform and then injection molding the over-molding material onto the preform is also a useful technique. Selection of the thermoplastic over-molding material depends on the particular aesthetics and functionality desired for a particular application. For example, the over-mold material compositions may be selected to achieve a desired aesthetic or other functionality. Processing considerations and other factors also impact the selection. For instance, the density, stretch ratio, color, cost, and recyclability of different over-mold thermoplastics may differ, depending upon the ultimate use or design constraints of the over-molded container.

The amount of surface of the preform covered by the over-mold material or materials can vary, depending for example, on the particular design of the container being made. In one embodiment, the over-molded material covers a majority of the outer surface of the over-molded container. For example, the over-mold material can cover between 30% and 95% of the exterior surface area of the preform. In other embodiments, the less than 30% of the exterior surface is covered.

Over-mold layer refers to a composition comprising a thermoplastic that can be over-molded at conditions compatible with the preform and a blow molding process. In preferred embodiments, the over-mold layer is selected to be processible at temperatures and pressures compatible with the blow molding of the preform, so that the over-mold layer is able to conformingly stretch, with the preform, and take the shape of the resulting blow molded container. The over-mold layer is selected to be sufficiently soft that it takes the shape of the mold during and after blow molding. The underlying thermoplastic polymer, once cooled after the blow-molding process, is of sufficient rigidity to maintain the over-molded layer in its stretched and molded shape.

I claim:

1. A preform having a first end and a second end, the preform having a preform body layer having an outer surface and a plurality of thermoplastic over-mold layers overmolded directly to the outer surface of the preform body layer, the outer surface being smooth and continuous, the plurality of thermoplastic over-mold layers being of different colors from one another, a portion of the outer surface of the preform body layer without an over-mold layer, and at least one of the plurality of thermoplastic over-mold layers having a thickness gradient.

2. A preform as in claim 1 wherein the preform body layer is of a first color and at least one of the plurality of thermoplastic over-mold layers is of a second color.

3. A preform as in claim 1 wherein the at least one of the plurality of thermoplastic over-mold layers on the preform body layer has a color gradient from the first end to the second end.

4. A preform as in claim 1 wherein the at least one of the plurality of thermoplastic over-mold layers on the preform body layer has a color gradient from the second end to the first end.

5. A preform as in claim 1 wherein the preform body layer is a first color, the preform body layer visible in a portion with no over-mold layer, the color of the preform body layer and the at least one of the plurality of thermoplastic over-mold layers blending in an area of thickness gradient.

6. A preform as in claim 1 wherein the thermoplastic body layer is selected from the group consisting of polyethylene terephthalate, polybutylene terephthalate and polyethylene naphthalate.

7. A preform as in claim 1 wherein each of the plurality of thermoplastic over-molded layers is selected from the group consisting of polyethylene terephthalate, polybutylene terephthalate, polyethylene naphthalate, polyethylene polymers, polyethylene copolymers, polypropylene polymers, polypropylene copolymers and vinyl copolymers.

8. A preform as in claim 1 wherein the thickness of the at least one of the plurality of thermoplastic over-mold layers varies from one of the first end toward the second end and the second end toward the first end.

9. A preform as in claim 8 wherein the thickness of the at least one of the plurality of thermoplastic over-mold layers is greater at the second end, the color of the preform being darker at the second end.

10. A preform as in claim 1 wherein the plurality of thermoplastic over-mold layers are separate layers.

11. A preform as in claim 1 wherein the preform body layer is of a different color from at least one of the thermoplastic over-mold layers.

* * * * *